United States Patent [19]

Martin

[11] Patent Number: 4,463,963
[45] Date of Patent: Aug. 7, 1984

[54] DRIVING MECHANISM FOR BICYCLE AND THE LIKE DEVICES

[76] Inventor: Savy Martin, 43B Gitanjali, Behind Strand Cinema, Colaba, Bombay, State of Maharashtra, India, 400 005

[21] Appl. No.: 305,923

[22] Filed: Sep. 28, 1981

[51] Int. Cl.³ .............................................. B62M 1/04
[52] U.S. Cl. ....................................... 280/253; 74/42; 280/221; 280/256
[58] Field of Search ................................. 280/253–258, 280/220, 221, 210, 251, 250; 74/42, 36, 594.5

[56] References Cited

U.S. PATENT DOCUMENTS

| 1,558,851 | 10/1925 | Edwards et al. | 280/221 |
| 1,998,293 | 4/1935 | Sweany | 280/221 |
| 2,086,445 | 7/1937 | Smith | 280/221 |
| 4,124,222 | 11/1978 | Moe et al. | 280/255 X |

FOREIGN PATENT DOCUMENTS

| 112293 | 1/1941 | Australia | 280/221 |
| 101516 | 12/1897 | Fed. Rep. of Germany | 280/257 |
| 297012 | 6/1932 | Italy | 280/221 |
| 25301 | of 1899 | United Kingdom | 280/253 |
| 19113 | of 1914 | United Kingdom | 280/257 |

Primary Examiner—Joseph F. Peters, Jr.
Assistant Examiner—Mitchell J. Hill
Attorney, Agent, or Firm—Charles A. Muserlian

[57] ABSTRACT

This invention relates to a driving mechanism for bicycles and the like devices wherein the conventional frame, seat and chain axle drive is employed, characterized in that an oscillating arcuate body is mounted on a base connected to the bicycle frame, said arcuate body having a foot rest connected through a bracket to said base, a connecting rod is connected from the front tip of said arcuate body to an eccentrically mounted crank shaft, said crank shaft being mounted on a sprocket wheel driving the chain and axle drive of the bicycle and like devices.

4 Claims, 11 Drawing Figures

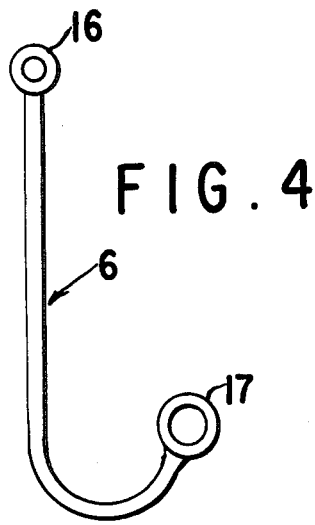
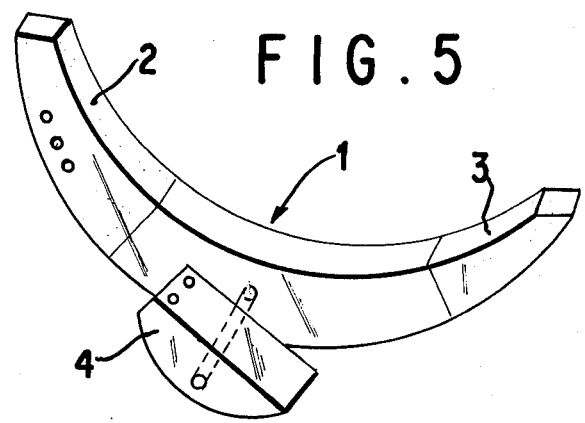
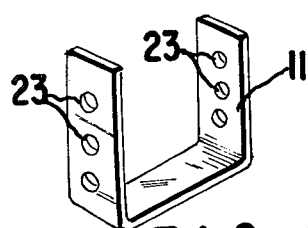
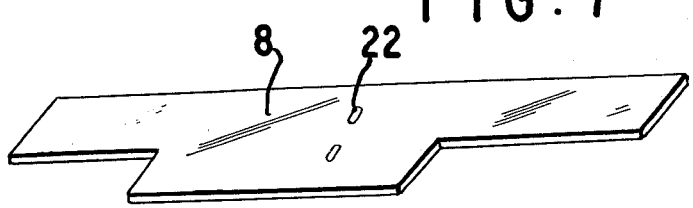
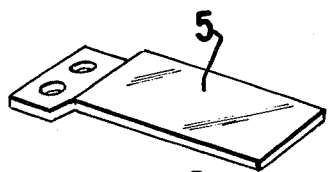
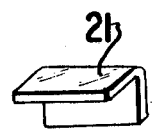
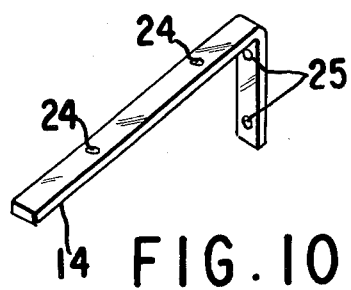
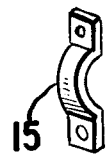

DRIVING MECHANISM FOR BICYCLE AND THE LIKE DEVICES

The invention relates to improvements in or relating to the driving mechanism for a bicycle or like devices. In particular, this invention relates to bicycles in which the conventional pedals are replaced by a device to enable a person to ride a bicycle without bending the riders legs at the knee.

BACKGROUND OF THE INVENTION

In the prior art bicycles, the pedals are so arranged that they move in a circular opposed fashion to each other. The cycle is driven by rotating the legs in a cycling action by flexing the legs at the knee alternately. This flexing knee action may be impossible for some people as for example persons having an artificial leg or whose knee has become calcified because of inaction or disease.

Further, it has also been found that a considerable amount of energy is wasted in the reverse free wheel action of the leg which is not driving the cycle at any given moment.

OBJECTS AND FEATURES WITH BRIEF DESCRIPTION

An object of the present invention, therefore is to provide a driving mechanism for the common cycle using the conventional chain and axle drive wherein the pedals are replaced by a compensatory driving mechanism consisting of a foot rest attached to an arcuate body oscillating on a base connected to the cycle frame; said arcuate body being connected by connecting rod to an eccentric crank shaft which is connected to the front sprocket of the conventional cycle. The pressing of the foot rest causes the depression of the arcuate body which in turn rotates the crank shaft and in turn the front sprocket. The motion of the front axle is transmitted to the rear driving sprocket by the conventional chain.

According to the present invention, there is provided a driving mechanism for a bicycle and the like devices using the conventional chain and axle drive comprising an arcuate body oscillating on a base connected to the cycle frame; a foot rest attached or integral with the arcuate body connected to the said base through a bracket, a connecting rod connecting the arcuate body to an eccentrically mounted crank shaft and a sprocket wheel mounted on the said crank shaft for driving the chain and axle drive of the cycle.

According to another feature of the invention, the said arcuate body is leaded at its tips.

According to another feature of the invention, the said arcuate body is spring loaded.

According to another feature of the invention, the said bracket connecting the foot rest to the base is provided with a plurality of holes for the said connection.

THE DRAWINGS

In the drawings an embodiment of the invention is set forth, wherin:

FIG. 4 illustrates a front elevation of the connecting rod.

FIG. 5 illustrates the arcuate body.

FIG. 6 represents the bracket.

FIG. 7 illustrates an isometric view of the base.

FIG. 8 illustrates an isometric view of the foot rest.

FIG. 9 illustrates an angle for supporting the base on the cycle frame.

FIG. 10 represents the main bracket arm connecting the base to the frame.

FIG. 11 represents the loop bracket for connecting the main bracket arm to the cycle frame.

FIG. 1 represents the assembled view of the driving mechanism and FIGS. 2 to 11 represent the views of the various parts.

Figure 3:
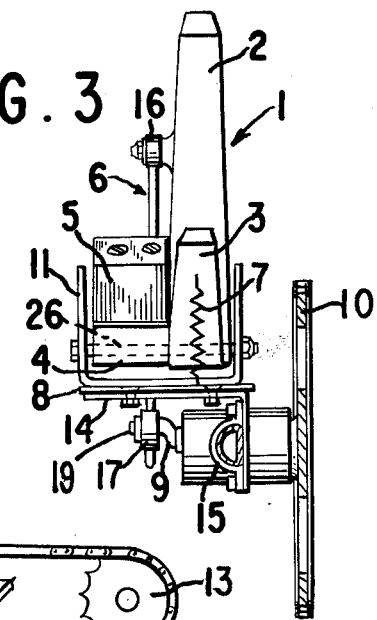
FIG. 3 illustrates an end elevation of the mechanism.

The mechanism consists of the arcuate body 1 having loaded tips 2 and 3 (particularly illustrated in FIG. 5). The tips 3 and 2 may be made of heavy metal. To the arcuate body 1 is attached or is made integral a foot rest block 4 having a foot rest pad 5. The foot rest block 4 and the arcuate body 1 are connected to a bracket 11 through the pin 26 as seen FIG. 3. The bracket 11 as seen in FIG. 6 has a plurality of holes 23 through which the pin 26 can pass for adjustment of the height and angle of the block 4. The assembly of the arcuate body 1, the block 4 and the bracket 11 is in turn welded or otherwise connected to the base 8. The base 8 is connected to the frame of the cycle (not shown in FIGS. 2 to 11). The holes 22 are used to hold the base 8 on to the mounting bracket 14 by connection with holes 24 whereas the holes 25 are used to fix clip 15 (see FIGS. 1, 3, 10 and 11) to the frame of the cycle.

Figure 1:
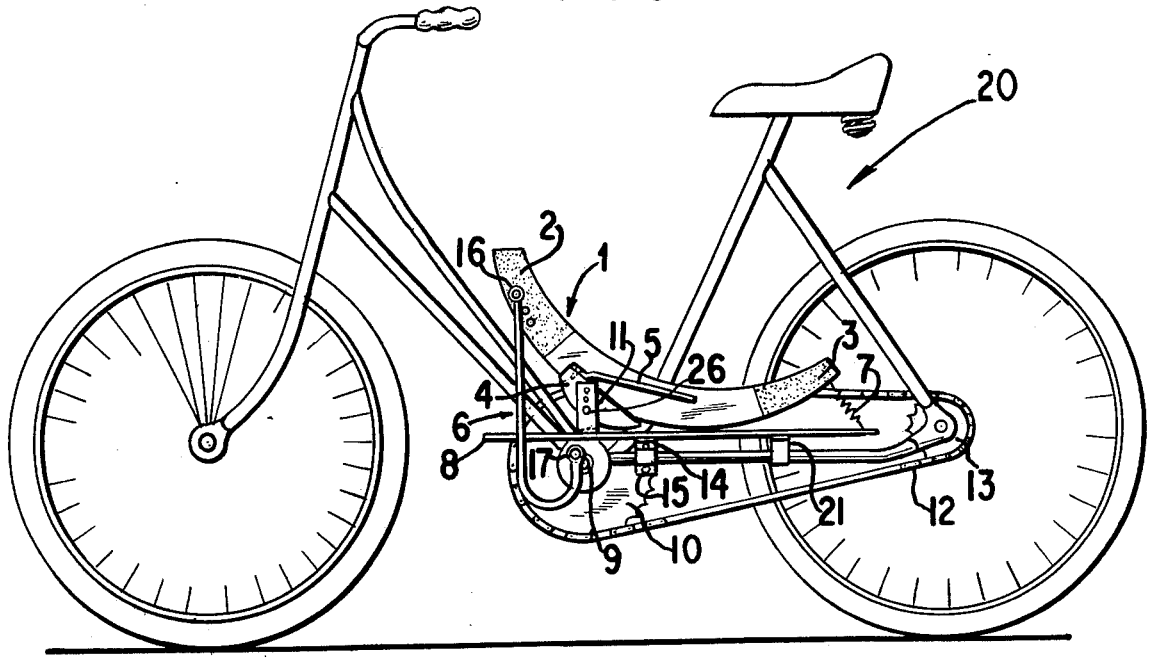
FIG. 1 is an isometric view of the bicycle having the driving mechanism according to the invention.
Figure 2:
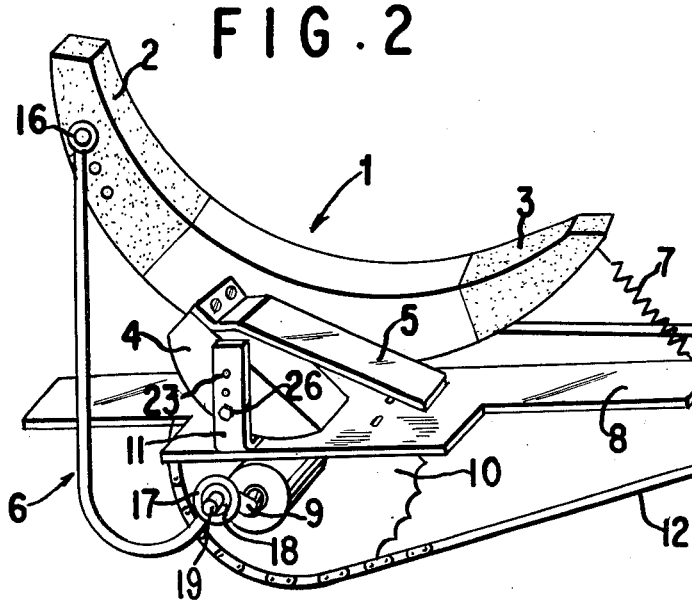
FIG. 2 illustrates an isometric view of the mechanism employed to this invention.

The arcuate body 1 (as seen particularly in FIG. 5) is shaped like an arc and has loaded tips 2 and 3. On the front end (near tip 2) of the body is connected the connecting rod 6 (see FIG. 4) at its end 16. The connecting rod 6 is fitted below the mechanism and is connected through a bearing 18 (see FIG. 2) placed within the end 17 of the connecting rod 6 to the crank shaft 9 (particularly seen in FIG. 2). The mounting of the connecting rod is eccentric, since the end 17 of the rod 6 is connected to the offset 19 of the crank shaft 9. Thus up and down motion of the connecting rod 6 causes rotation of the crank shaft 9. Near tip 3 of the arcuate body 1 is connected a spring 7 (particularly seen in FIG. 1) the other end of which is connected to base 8. Angle brackets 21 (as seen in FIG. 1) are welded or otherwise connected to the base and fixed on the cycle frame for additional support of the base and thereby the mechanism to the cycle. A foot pad 5 (particularly seen in FIG. 8) is provided for convenience of the rider. The crank shaft 9 is connected to the front sprocket wheel 10 of the cycle and as is conventionally done through the chain drive 12 to the rear sprocket wheel 13.

WORKING ON THE INVENTION

The rider mounts the cycle 25 and places his foot on the foot rest pad 5. In another embodiment of the invention, the driving mechanism may be provided on either side of the cycle for both the feet or connection given by way of a rod from both front and back of the arcuate body so that the right leg could also be used to press the pad or if necessary the right leg is used to assist the return stroke by pressing the rear rod when the bicycle is ascending. Forward pressure on the pad 5 depresses the block 4 and hence the arcuate body 1 downwards. Thus in turn causes the connecting rod 6 to move down and hence the crank shaft rotates to accommodate the downward motion of the connecting rod. The arcuate body 1 has been screwed against spring tension. Further the kinetic energy created also turns the crank shaft.

This causes the arcuate body to return to its position. Further, the bending of the foot at the axle may also used for the return stroke. The front sprocket thus continuous to turn as long as the depression of the foot pad and the movement of the arcuate body is maintained.

Thus no flexing of the leg at the knee is required to be done and further even the use of one leg is sufficient to drive the vehicle smoothly. Practice trials have shown that the power generated is about one and a half times more than the power generated in the conventional cycling action and no movement of the leg is wasted. In the prior art the return movement of the pedals does not constitute a power stroke. In the mechanism according to this invention, the return stroke, i.e. when the arcuate body springs back to its original position is itself a power stroke.

Apart from the obvious uses by the physically handicapped, this cycle is also is a powerful vehicle for conventionally driving as it involes better utilisation of the leg energy.

I claim:
1. A driving mechanism for a bicycle and the like devices having a conventional frame, seat and chain and axle drive, comprising an oscillating arcuate body oscillatingly mounted on a base secured to the frame; said arcuate body having a foot rest connected to a bracket attached to said base, a connecting rod connecting the front tip of said arcuate body to an eccentrically mounted crank shaft, and a sprocket wheel mounted on said crank shaft driving the chain and axle drive of the cycle, said arcuate body being weighted at each of its two ends.

2. A driving mechanism for a bicycle and the like devices as claimed in claim 1, wherein said arcuate body is spring loaded.

3. A driving mechanism for a bicycle and the like devices as claimed in claim 1, wherein said bracket connecting the foot rest to the base is provided with a plurality of holes for said connection.

4. A driving mechanism for a bicycle and the like devices as claimed in claim 2, wherein said bracket connecting the foot rest to the base is provided with a plurality of holes for said connection.

* * * * *